United States Patent [19]

Saito et al.

[11] Patent Number: 4,717,142

[45] Date of Patent: Jan. 5, 1988

[54] SHEETS ALIGNER FOR USE IN A PRINTING PRESS

[75] Inventors: Nobuaki Saito; Fumio Osawa, both of Ibaraki, Japan

[73] Assignee: Komori Printing Machinery Co., Ltd., Japan

[21] Appl. No.: 938,803

[22] Filed: Dec. 8, 1986

[51] Int. Cl.⁴ .............................................. B65H 31/10
[52] U.S. Cl. .................................... 271/217; 271/221; 271/223
[58] Field of Search ................ 271/210, 221, 222, 223, 271/215, 217

[56] References Cited

U.S. PATENT DOCUMENTS 2,626,147  1/1953  Gjostein ............................ 271/222 X
4,585,225  4/1986  Miura ................................... 271/215

Primary Examiner—Richard A. Schacher
Attorney, Agent, or Firm—Remy J. VanOphem

[57] ABSTRACT

A sheets aligner is provided with a frame body having vertical surfaces perpendicular to each other, a vertically movable table supported within the frame body, and a plurality of front lays extending along the respective vertical surfaces, thereby to stack on a pallet sheets fed to a sheet feed device for a sheet-fed printing press while aligning the sheet edges by vibration. The sheet aligner is provided with an opening formed in one of the vertical surfaces which is positioned in a direction to the sheet feed direction, the opening being adapted for permitting the pallet to be protruded from the frame body, a pallet stopper for stopping the pallet extruding from inside toward outside of the frame body, and a stop for closing a gap between each lower end of the front lays and the upper surface of the pallet. Thus, this arrangement permits a pallet e.g. for a maximum sized sheet to be used commonly to various sheet sizes. In addition, the provision of the auxiliary stop can eliminate the possibility that sheets are protruded toward the outside of the frame body even under condition vibration is present.

4 Claims, 11 Drawing Figures

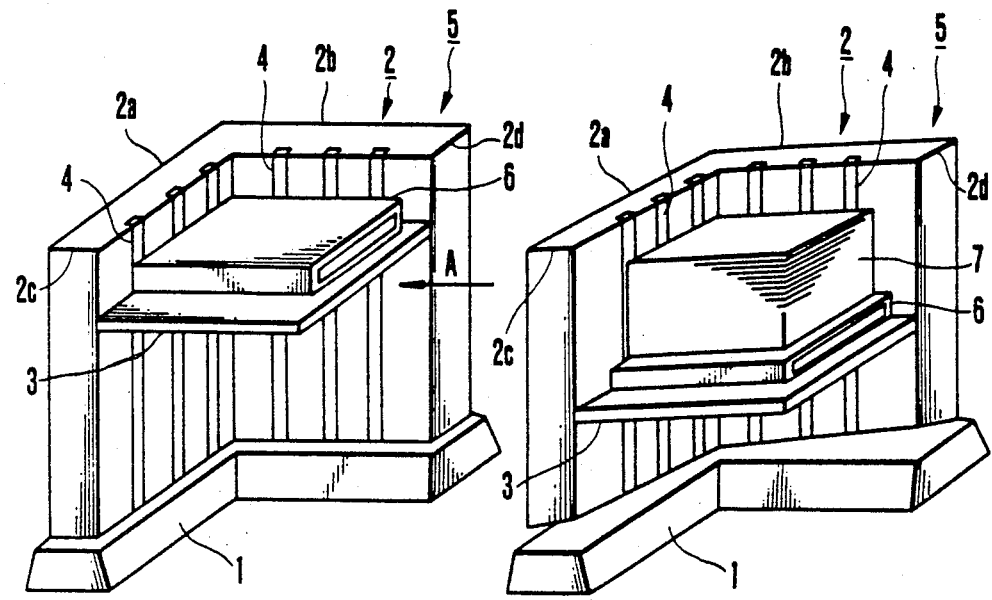
FIG. 1
(PRIOR ART)
FIG. 2
(PRIOR ART)
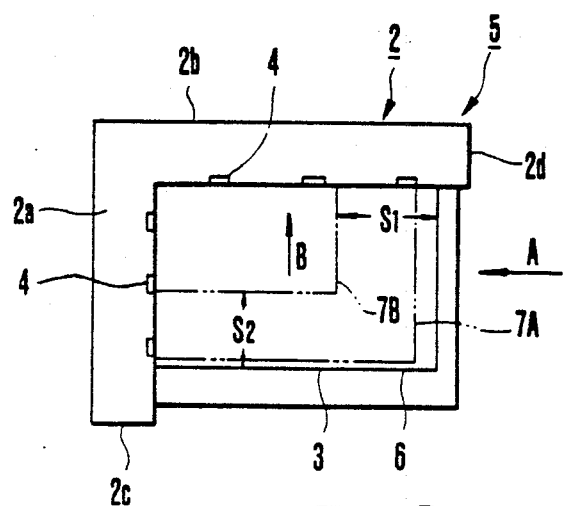
FIG. 3
(PRIOR ART)

SHEETS ALIGNER FOR USE IN A PRINTING PRESS

BACKGROUND OF THE INVENTION

The present invention relates to a sheets aligner for use in a sheet fed printing press, and more particularly to a sheets aligner which stacks on a pallet a large number of sheets fed to a sheet feeder of the sheet-fed printing press, the sheets aligner having front lays which stop the sheets to align their edges.

The sheet feeder of the sheet-fed printing press is provided with a sheet stacking board for stacking sheets for printing. The sheets stacked are sucked one by one from ones positioned at the upper layer by means of a suction device and then are sent out onto a feed board. Thereafter, they are delivered to a printing unit at which a required printing is implemented thereto. In this instance, the sheets are heaped up on a pallet in a different place and then conveyed to the sheet stacking board by means of a lift etc. If edges of the sheets stacked on the pallet are not aligned, a mis-registration of the printing will be caused, resulting in occurence of waste sheets. For this reason, a sheet aligner which stacks the sheets while aligning their edges is provided in a place where the sheets are heaped up on the pallet.

The recent automatic printing press has a sheet alignment and turn over station therein. Sheets which have been packaged, e.g., every several hundred thereof and stored in a warehouse are conveyed onto a lift table of the station. Thus, the sheets conveyed is delivered to the sheet aligner from the lift table, and then is delivered onto the pallet while they are unpacked and is subjected to alignment. In addition, when printing is required to be implemented on the back sides of the sheets which have been printed at the printing unit, the sheets stacked on the sheet stacking board are conveyed to the sheet alignment and turn over station by means of a conveyor while the sheets are stacked on the pallet. The sheets conveyed are turned over by means of a turn over machine provided in association with the sheet aligner, and then are delivered from the lift table to the sheet aligner, at which they are subjected to the alignment.

FIGS. 1 and 2 are perspective views schematically illustrating a conventional sheet aligner. FIG. 1 shows the condition that the pallet has been delivered to the sheet aligner and FIG. 2 shows the condition that sheets are stacked on the pallet. As seen from these figures, on an L-shaped base 1, a frame body 2 which is similarly L-shaped in plane is disposed with its lower end being rotatably supported. Within the frame body 2, a vertically movable table 3 which is driven by a drive unit to move upwardly and downwardly is provided. The frame body 2 is configured as follows. The frame body 2 is driven by a motor etc. so that it rotates about the lower end corner portion to selectively take a posture at which the movable table 3 shown in FIG. 1 is horizontally placed or other posture shown in FIG. 2 at which edges 2c and 2d of two sides 2a and 2b of the frame body 2 rises by the same heights from the first-mentioned position, that is, the frame body 2 is inclined. On the respective sides 2a and 2b of the frame body 2, a plurality of front lays are fixed vertically and parallel to each other, thereby the movement of the sheets movement is restricted.

In the sheets aligner 5 thus configured, a pallet 6 is delivered in a direction indicated by an arrow A perpendicular to the side 2a of the frame body 2 from a lift table (not shown) disposed adjacent to the frame body 2 onto the movable table 3 placed in the horizontal condition shown in FIG. 1. After the pallet has been delivered, the frame body 2 is inclined as shown in FIG. 2. During this time, the sheets which have been conveyed onto the lift table are delivered onto the pallet 6 every predetermined number by means of human power or a sheet conveying device recently being developed. The, these sheets are stacked as indicated by reference numeral 7 on the movable table 3 through the pallet 6, and the movable table 3 lowers depending upon the stacking amount of the sheets 7.

Thus, the supply of the pallet 6 onto the movable table 3 and the supply of the sheets 7 onto the pallet 6 are stopped by the contact of the pallet 6 and the sheets 7 with the front lays 4. Then, a vibrating plate (not shown) gives a vibration to the edges of the sheets 7 which are in contact collectively with the front lays 4, whereby the sheet edges are aligned.

However, such a conventional sheets aligner has the problem in the handling when the sheet size is changed. Namely, as shown in a schematic plan view of the sheet aligner in FIG. 3, the sheets stacked on the pallet 6 change between the maximum size sheet labeled 7A and the minimum size sheet labeled 7B. Corresponding two sides of the sheets 7A and 7B and the pallet 6 are aligned by the front lays 4 provided on the two sides 2a and 2b of the frame body 2 irrespective of the sheet size. Accordingly, when the pallet 6 provided in conformity with the sheet 7A of maximum size is used commonly to a sheet having a size smaller than the maximum size, for example, the sheet 7B of minimum size, blank portions indicated by symbols $S_1$ and $S_2$ are formed between two sides opposite to the front lays 4 of the sheet 7B and two sides of the pallet 6. The pallet 6 on which the sheets 7 are stacked is delivered to the sheet feeder of the printing press with it being positioned so that the sheets 7 are fed to the printing unit ordinarily in direction indicated by an arrow B in FIG. 3. When the minimum size sheets 7B are delivered, since the center of the paper 7B greatly deviates to the left with respect to the machine width center, the pallet 6 on which the sheets 7B are placed must be greatly moved in a left direction approximately by $S_1/2$ on the printing press as compared with the case of the maximum size sheet, resulting in the possibility that the pallet 6 can not be moved because the pallet 6 is in contact with the frame body 2. Accordingly, when applied to such a center reference type printing press, it has been impossible to use the pallet 6 commonly to various sheet sizes. Another attempt is made to commonly use a smaller sized pallet 6. In this case, sheets having a size larger than that of such a pallet such as the maximum size sheets 7A will be loaded with the pallet 6 being drawn from the sheet edges during sheet stacking. This results in the inconveniences that not only the pallet 6 is difficult to be conveyed but also the sheet edges protruded from the pallet 6 become stained or damaged. Further, in the case where the pallet 6 is used commonly to various sheet sizes, if the sheet size is small at the time when the printing is applied to the back sides of the above-mentioned sheets with they being turned over, there occurs the problem that the edges of the sheets which have been turned over and loaded do not fall within a range of movement of a side register device provided in the printing press.

Since the pallet 6 cannot be used commonly to various sheet sizes for the reason stated above, many kinds of pallets 6 corresponding to the sheet sizes must be prepared, giving rise to the problems that not only the work becomes troublesome with a result of increasing the cost required therefor, but also control becomes difficult during conveying or at various processes such as a printing process, unless kinds of the pallets 6 are unified at the above-mentioned automatic factory.

SUMMARY OF THE PRESENT INVENTION

With the above in view, an object of the present invention is to provide a sheets aligner for use in a sheet fed printing press which has eliminated drawbacks encountered with the prior art devices, and which has an improved sheet alignment function.

Another object of the present invention is to provide a sheets aligner which permits a pallet for a maximum size sheet to be used commonly to various sheet sizes to provide an improved work efficiency and a reduced cost.

To achieve these objects, the present invention is implemented as follows.

A sheets aligner provided with a frame body which has vertical surfaces perpendicular to each other and is capable of selectively taking either an upright posture or an inclined posture, one of the vertical surfaces of the frame body which is positioned in a direction perpendicular to a feed direction of sheets to the printing press is provided with an opening;

a vertically movable table supported for moving upwardly and downwardly within said frame body;

a pallet which is mounted on the vertically movable table and loaded with the sheets, an end portion of the pallet is permitted to protrude through said opening of the vertical surface of said frame body from the inside to the outside of the frame body;

a plurality of front lays which extend vertically along the respective vertical surfaces to allow edges of the sheets to be in contact collectively therewith, the front lays being moved upwardly and downwardly with said vertically movable table;

a pallet stopping means disposed at the outside of the opening of the frame body for stopping said pallet which is extruding from inside to outside of the frame body at a predetermined position according to a size of sheet; and a gap closing means for closing a gap between each of lower ends of the front lays and an upper surface of the pallet in accordance with a detection of the end of the pallet.

BRIEF DESCRIPTION OF THE DRAWINGS

In the drawings,

FIGS. 1 and 2 is a perspective view schematically illustrating a conventional sheets aligner wherein FIG. 1 shows the condition that the pallet has been delivered thereto and FIG. 2 shows the condition that sheets have been stacked on the pallet, FIG. 3 is a schematic plan view of a conventional sheets aligner illustrated for explaining a relation between sizes of the pallet and sheets.

DETAILED DESCRIPTION OF THE PREFERRED EMBODIMENT

Figure 4:
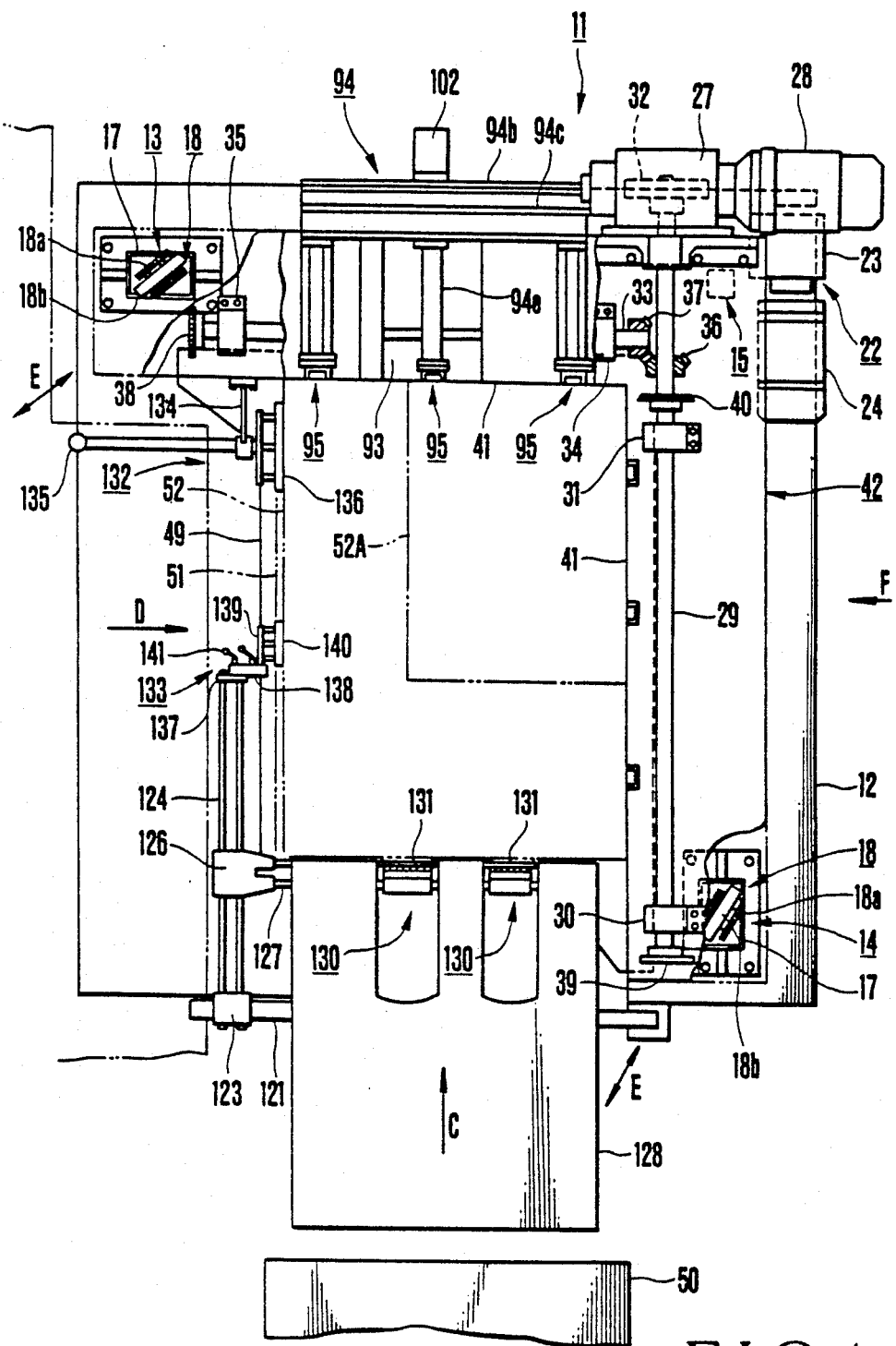
FIG. 4 is a plan view of an embodiment of a sheets aligner according to the present invention.

An embodiment of a sheets aligner for use in a printing press according to the present invention will be described in detail with reference to attached drawings.

As shown in FIGS. 4 to 8, the sheets aligner 11 is formed with a frame structure comprising a base 12 which is substantially square-shaped in plane fixed on a foundation formed on a floor, fixed supports 13 and 14 and a support 15 with an inclination device which are projectedly provided at three corners of the base 12, respectively, a frame 16 which is L-shaped in cross section and in plane and supported by the supports 13, 14 and 15. The fixed supports 13 and 14 are disposed on a diagonal line of the base 12 so that they are opposite to each other. Each of these supports 13 and 14 comprises a hollow pillar 17 which has rectangular cross section and stands upright by fastening its base plate to the base 12 using bolts, and a bracket 18 fixed on the upper portion of the pillar 17. The bracket 18 is formed with a U-shaped guide 18a fixed on the upper end surface of the pillar 17 so that it inclines at an angle of 45 degrees, and a T-shaped metal fitting 18b supported rotatably by the guide 18a through rollers and movable in a direction labeled E in FIG. 4. To the both brackets 18, two portions of the frame 16 are fixed by means of bolts threadedly inserted into the metal fittings 18b. The support 15 with inclination device is formed with a pillar 19 standing upright the bottom of which is fixed to the base 12, a square pillar 20 movable upwardly and downwardly, of which four vertical surfaces are supported by the upper and middle portions of the pillar 19 through rotatable rollers (not shown), a bracket 21 fixed on the upper end portion of the square pillar 20, and an inclination device 22 provided on the upper end portion of the pillar 19. The inclination device 22 is formed with a motor 24 (see FIG. 4) for inclination fixed to a transmission box 23, a pinion 25 (see FIGS. 5 and 6) on a shaft which is drivingly joined to the motor 24 by means of a worm and a worm wheel, and a rack 26 (see FIG. 6) formed in the square pillar 20 and meshing with the pinion 25. When the motor 24 rotates, the pinion 25 rotates so that the square pillar 20 moves upwardly and downwardly. The bracket 21 is formed with a U-shaped bearing 21a fixed to the upper end portion of the square pillar 20, and a T-shaped metal fitting 21b supported by the bearing 21a through a radial roller bearing. The metal fitting 21b is fixed to the corner of the frame 16. By employing such an arrangement, when the square pillar 20 is lowered by the motor 24 with the frame 16 being in horizontal condition, the frame 16 rotates about the rollers provided in the brackets 18 on the side of the fixed supports 13 and 14. Thus, the frame 16 is in inclined condition where only the square pillar 20 side threrof has been lowered. The displacement on the side of the fixed supports 13 and 14 caused by this inclination is absorbed by lateral movements of the rollers provided in the brackets 18. In addition, the change of an angle formed by the square pillar 20 and the frame 16 on the square pillar 20 side is absorbed by the radial roller bearing.

A device for moving upwardly and downwardly the vertically movable table is provided on the frame 16 thus supported. Namely, on the upper surface of the frame 16, a transmission box 27 (FIGS. 4 and 6) is fixed at one corner on the side where the inclination device 22 is provided. A motor 28 for upwardly and downwardly moving the vertically movable table is attached to the transmission box 27. A drive shaft 29 for upward and downward movement is axially supported by the bearing unit of the transmission box 27. The drive shaft 29 extends in a direction of the fixed support 14 on the frame 16. The other end and the middle portion of the drive shaft 29 are axially supported by bearings 30 and 31 on the frame 16, respectively. At a portion where the drive shaft 29 is fitted into the transmission box 27, a worm wheel 32 which meshes with the worm on a axis of a motor 28 is axially affixed. Another drive shaft 33 perpendicular to the drive shaft 29 extends to the fixed support 13 side. Both the ends of the drive shaft 33 are axially supported by bearings 34 and 35 on the frame 16, respectively. Both the drive shafts 29 and 33 are drivingly connected by bevel gears 36 and 37. In addition, three sprokets 38, 39 and 40 are axially affixed to portions on the drive shafts 29 and 33 close to the supports 13, 14 and 15, respectively. On the other hand, at L-shaped inner and outer end edges of the frame 16, covers 41 each having a vertical surface in the form of a rectangular plate which extends to the vicinity of the base 12 are integrally fixed and hang down. These covers 41 forming both the surfaces are projected upwardly from the frame 16. By connecting openings at the upper and lower portions and side portions of these covers 41 using plate members, an L-shaped box like frame body 42 similar to the conventional one designated by reference numeral 2 in FIG. 1 is formed in a body. By the inclination device 22, the frame body 42 inclines in a body. At the inner lower end portion within the frame body 42, three sprockets 43, 44 and 45 are positioned directly below the above-mentioned sprockets 38, 39 and 40, respectively, and are supported by the covers 41 through bearings (not shown). Between upper sprockets 38, 39 and 40 and lower sprockets 43, 44 and 45, chains 46, 47 and 48 are stretched in parallel to the inner surface of the frame body 42, respectively. A vertically movable table 49 which is formed as rectangular plates when viewed from plane is fixed to each portion of the chains 46, 47 and 48, which has same height. The vertically movable table 49 is driven by the motor 28 through the drive shafts 29 and 33 and the chains 46, 47 and 48, and moves upwardly and downwarly along the inner surface of the frame body 42 while maintaining the plane thereof perpendiculaly to the inner surface. A pallet 51 is delivered from a lift table indicated by reference numeral 50 in FIGS. 4 and 6 to the vertically movable table 49 and is mounted thereon. In addition, sheets 52 on the lift table 50 are delivered to the pallet 51 by a sheet coveying device which will be described later and are stacked on the pallet 51. The maximum size sheet is indicated by reference numeral 52 itself, and the minimum size sheet is indicated by reference numeral 52A.

Figure 7:
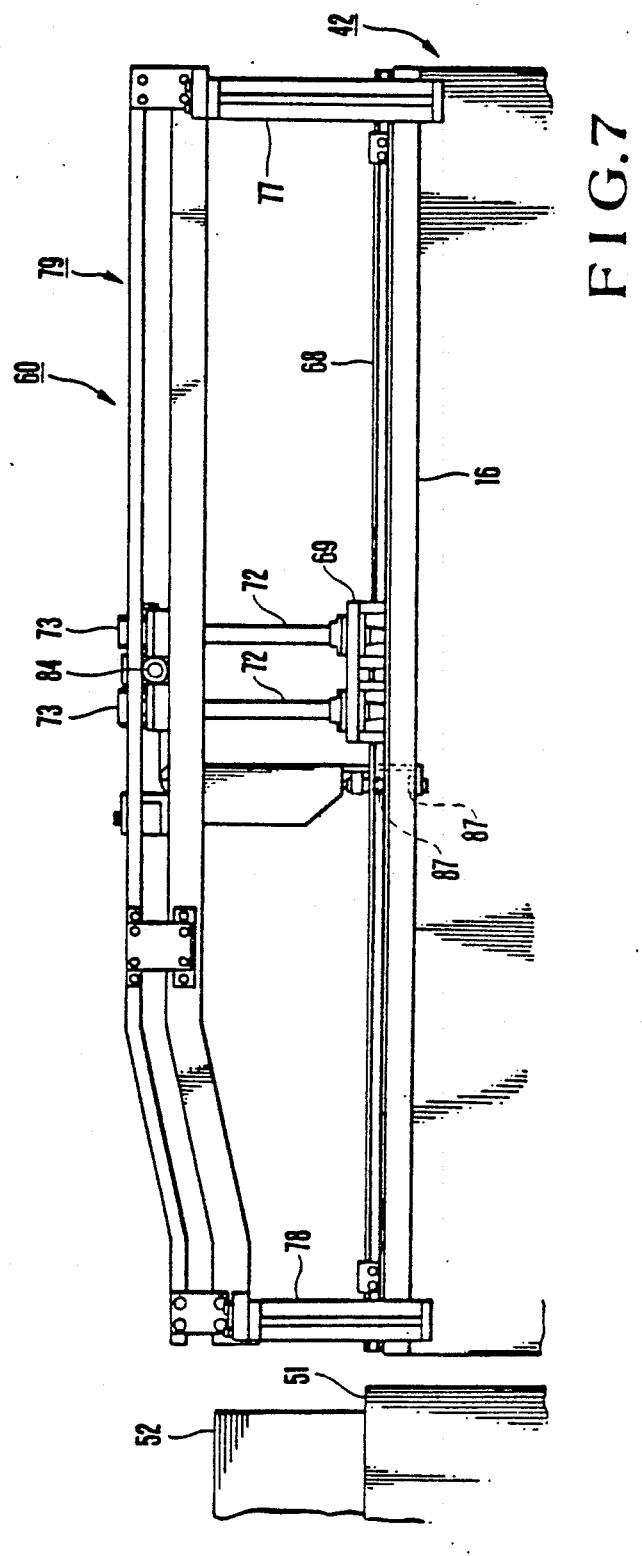
FIG. 7 is a side view when a sheet feed device employed in the present invention is viewed from the direction of an arrow F.
Figure 8:
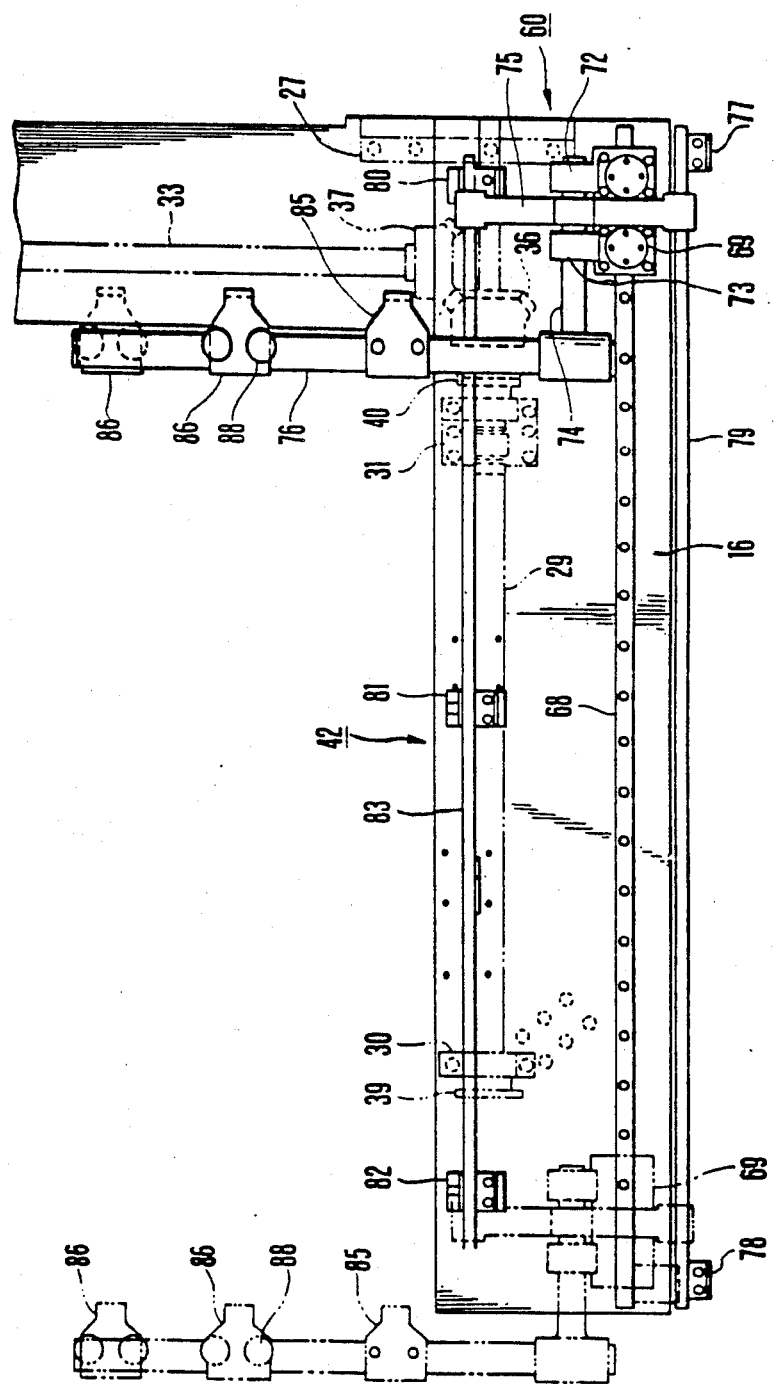
FIG. 8 is a plan view illustrating the condition that the sheet feed device shown in FIG. 9 is mounted on a frame.
Figure 9:
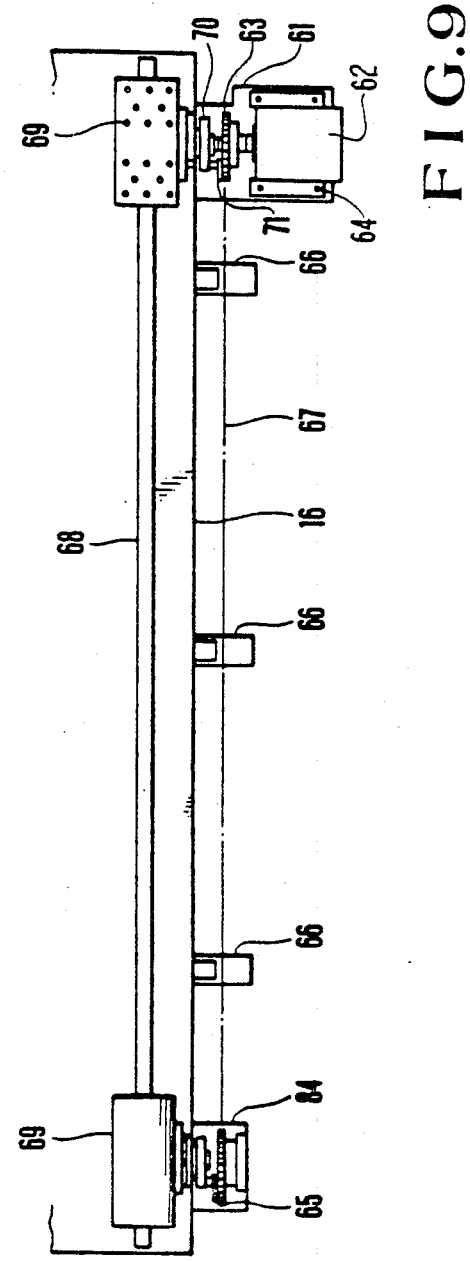
FIG. 9 is a plan view illustrating only a drive unit provided at the same portion as a portion of the sheet feed device shown in FIG. 10.
Figure 10:
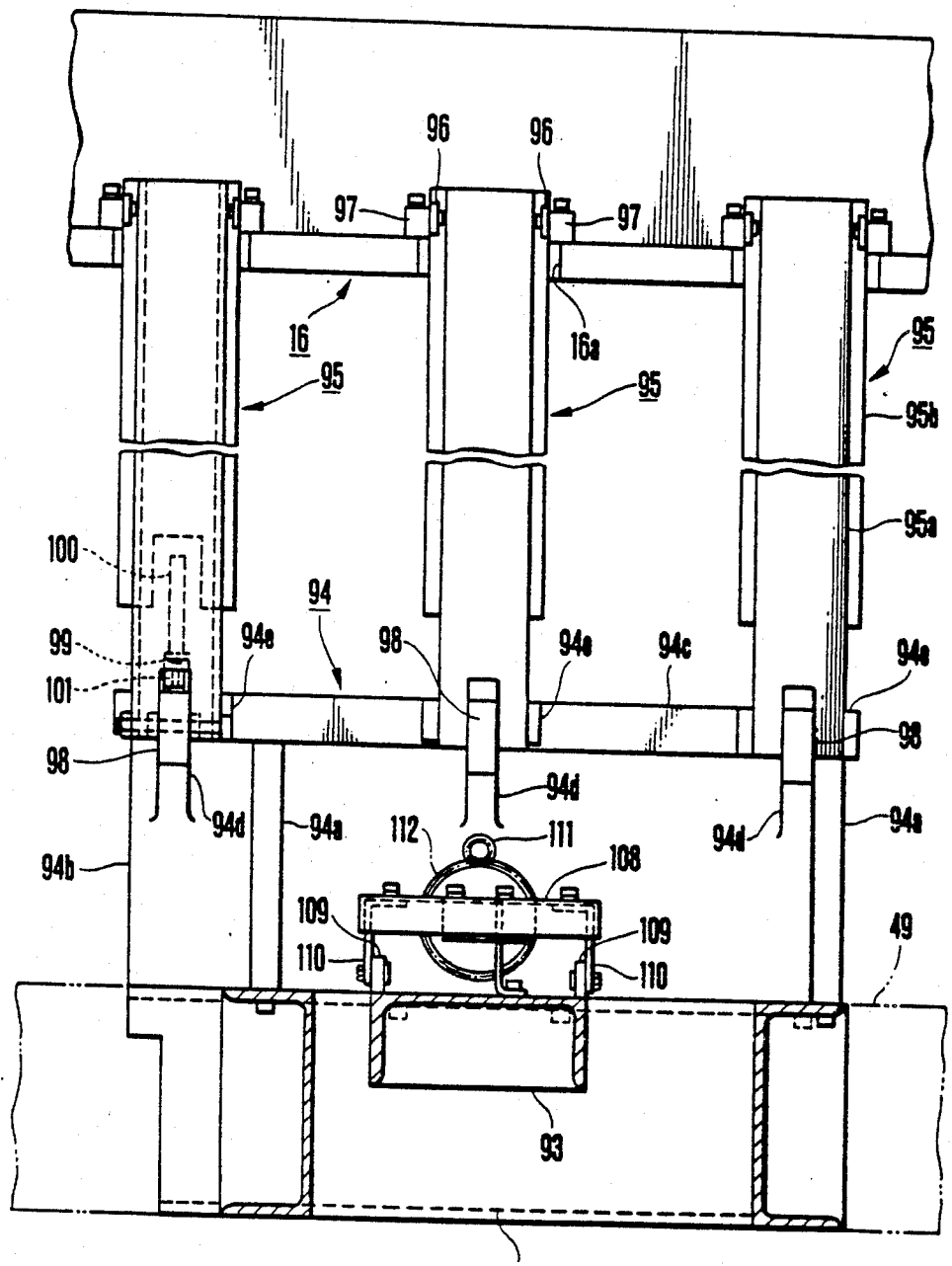
FIG. 10 is a partially expanded view of FIG. 5.

The outline of the sheet conveying device will be now described with reference to FIGS. 7 to 9. The sheet conveying device represented by reference numeral 60 is mounted on the frame 16. FIG. 7 is a side view illustrating the sheet conveying device when viewed from an arrow F in FIG. 4, FIG. 8 is a plan view illustrating that the sheet conveying device is mounted on the frame, and FIG. 9 is a plan view illustrating only a drive unit at the same portion as a portion of the sheet conveying device shown in FIG. 8. The scale indication in FIGS. 7 to 9 is 1.5 times larger than that in FIG. 4. As seen from these figures, the sheet conveying device 60 is provided with a drive unit for reciprocating a sheet gripper supported by the frame 16 of the sheet aligner 11. Namely, a motor table 61 is fastened at the side corner of the inclination device 27 of the frame 16 by means of bolts, and a motor 62 having a shaft on which a drive sprocket 63 is axially affixed is fixed on the motor table 61. Over a stud projected from a bracket 64 fixed at the end portion on the fixed support 14 side, a driven sprocket 65 is rotatably fitted. Between the both sprockets 63 and 65, a chain 67 guided by a chain guide 66 and running in one direction by the rotation of the motor 62 is stretched. On the other hand, on the frame 16, a rail 68 extending over the entire length of the frame 16 is laid in parallel to the chain 67. Over the rail 68, a rectangular running table 69 is slidably fitted. An eccentric plate 70 is rotatably provided on the running table 69 side and its axial center is positioned just at the intermediate portion of the upper and lower running portions of the chain 67. The outer periphery of the eccentric plate 70 having a diameter corresponding to each pitch diameter of the sprockets 63 and 65 and one portion of the chain 67 are linked by a link pin 71. As a result, when the running table 69 runs in accordance with the running of the link pin 67, thereby causing the link pin 71 to turn round the sprocket 63 or 65, the eccentric plate 70 rotates through 180 degrees with the result that the running table 69 turns back. Thus, the running in one direction of the chain 67 allows the running table 69 to repeat forward and backward movement, thus to effect reciprocating movement. On the upper surface of the running table 69, a pair of upward and downward movement guide shaft 72 having a spline are integrally projectedly provided. By each guide shaft 72, an arm bearing 73 having a spline groove which engages with the spline is supported so that it is upwardly and downwardly movable with the rotation therreof being restricted. An arm shaft 74 is axially supported by the arm bearing 73 in parallel to the rail 68. To the arm shaft 74, a balance like roller arm 75 and an arm 76 extending in a direction perpendicular to the rail 68 are integrally fixed in parallel to each other. In addition, on the frame 16, a higher cam table 77 and a shorter cam table 78 are projectedly provided so that they are close to the both running ends of the running table 69. Between these both cam tables 77 and 78, a groove cam 79 which is dog leg shaped when viewed from side plane is supported with it being stretched thereover. On cam supports 80, 81 and 82 of three kinds in height fixed on the frame 16, a cam 83 which is dog leg shaped like the groove cam 79 and has an inclination angle of the inclined portion steeper than that of the groove cam 79 is supported with it being stretched thereover in parallel to the groove cam 79 and the rail 68. Rollers 84 at both the ends of the roller arm 75 are engaged with the groove cams 79 and 83. Both the rollers 84 are always pressed onto the upper surface of the cam 83 and the upper inner surface of the groove cam 79 by the tare of the arm 76 etc. The lower cam plate of the groove cam 79 plays a role of restricting fluctuation of the arm 76. With the arrangement stated above, while the arm 76 runs from the position indicated by dotted lines to the position indicated by a solid line in FIG. 10, the roller arm 75 runs with it being guided by both the cams 79 and 83. In this instance, since the roller arm 75 fluctuates by the difference between heights of the both cams 79 and 83, the arm 76 also fluctuates between the horizontal attitude and the inclination attitude where the front end thereof lowers. Below the arm 76 located at the position indicated by dotted lines, front edges of the sheets 52 stacked on the lift table 50 are positioned. From two portions of the arm 76, a fixed support plate 85 and a support plate 86 adjustable in movement between the position indicated by the solid line and the position indicated by dotted lines in the figure hang below. At the lower portions of the support plates 85 and 86, two pair of disks 87 are provided in a manner that one pair of disks at the upper portion and the other pair thereof at the lower portion are opposite to each other. More particularly, the lower pair of disks 87 are in fixed condition, and the upper pair of disks 87 are upwardly and downwardly movable by an air cylinder (not shown). Thus, edge portions of the sheets 52 inserted by an operator are gripped with the upper and lower disks 87.

Figure 5:
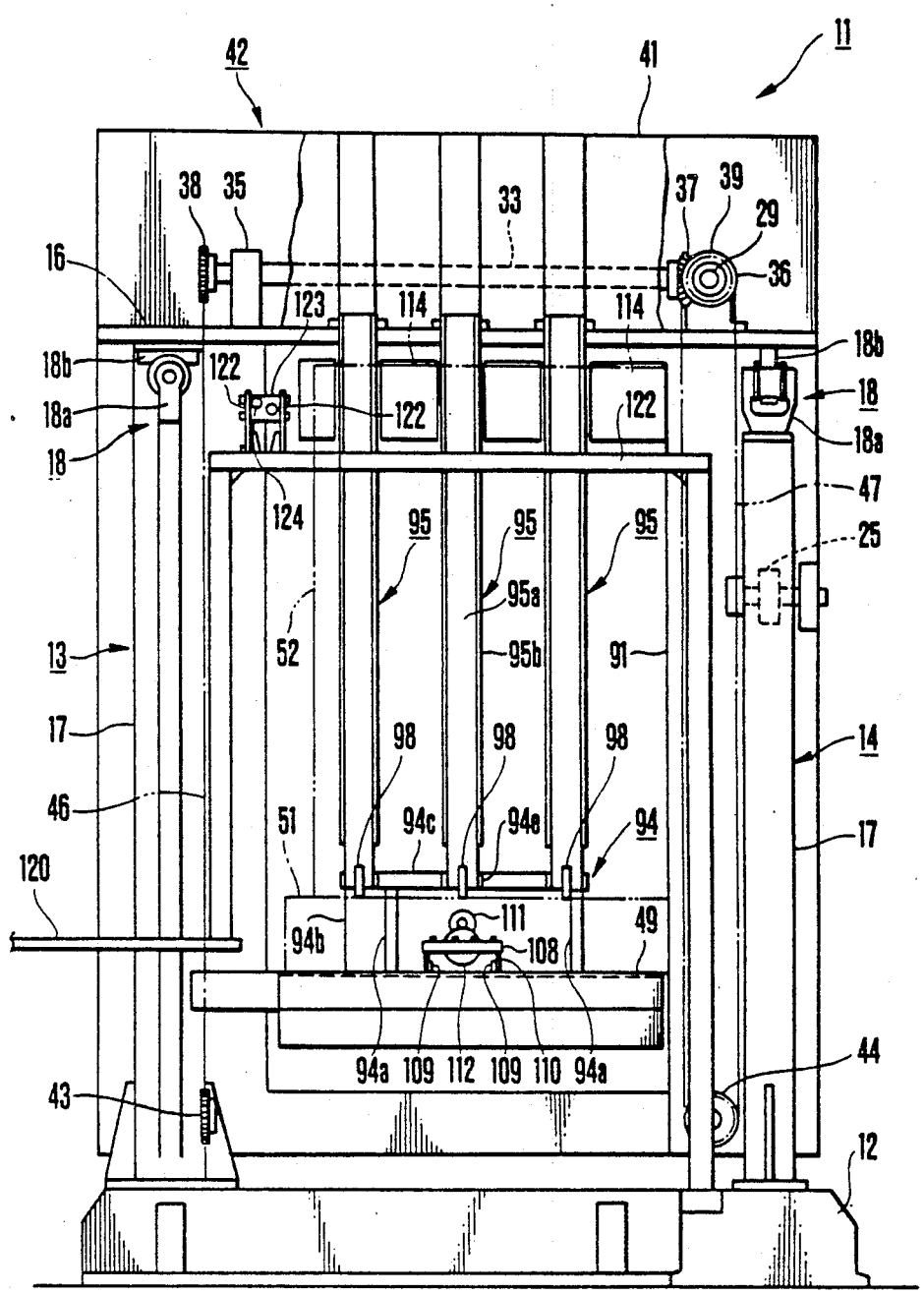
FIG. 5 is a front view when viewed from an arrow C in FIG. 4.
Figure 11:
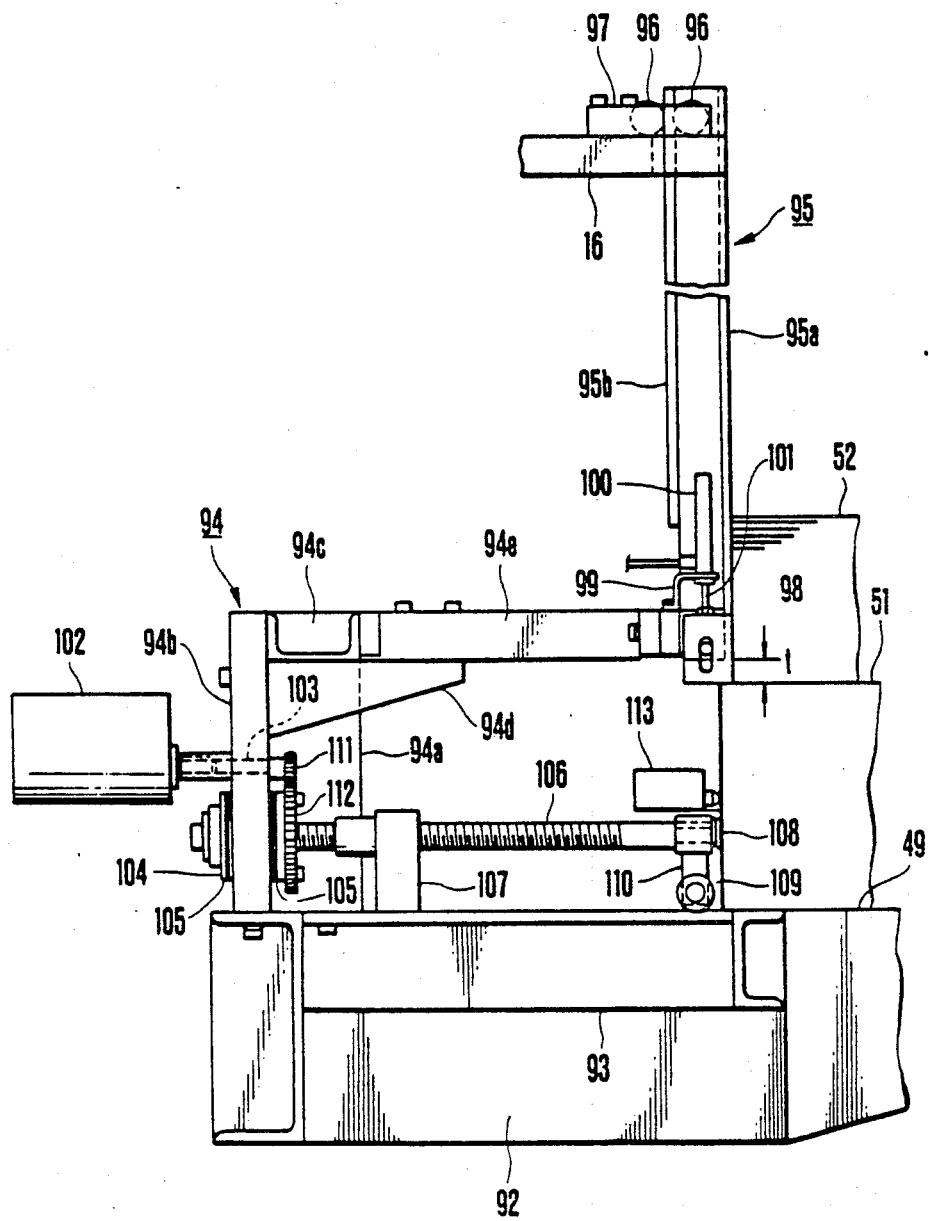
FIG. 11 is a partially expanded view of FIG. 6.

The sheets aligner is additionally provided with a front lay which stops respective bundles of sheets 52 conveyed by the sheet feed conveying device 60 and delivered onto the pallet 51, and causes them to be in contact collectively therewith during stacking, and vibration plates which exert vibration of the sheets 52 to align the sheet edges. The front lay and the vibration plates will be now described. In the cover 41 positioned at the short side which is one vertical surface of the frame body 42, an opening 91 formed rectangular is opened as shown in FIG. 5. Thus, the pallet 51 can be protruded from the opening 91 toward the outside of the frame body 42, and the pallet 51 can be upwardly and downwardly moved together with the vertically movable table 49 with it being protruded therefrom. Namely, as best seen from FIGS. 10 and 11, to the side surface on the opening 91 side of the vertically movable table 49, a base frame 92 which is channel-shaped in plane with a channel-shaped steel is welded, and is projected from the opening 91 to the outside. The projected end portion thereof and the vertically movable table 49 are connected at the upper end thereof by a horizontal slide table 93. A subframe 94 is vertically provided by fixing its bottom to the projected end portion of the base frame 92. The subframe 94 is integrally formed with a plate like vertical member 94b reinforced by a pair of ribs 94a, a horizontal member 94c connecting the upper end of the ribs 94a, and a plurality of support members 94e reinforced by ribs 94d and projected from the horizontal member 94c toward the opening 91. The supporting end portion of each support member 94e is reached to the opening 91 and faces above the pallet 51. Namely, the pallet 51 is slidably in contact with the slide table 93 within a space surrounded by the subframe 94 and the slide table 93, and is protruded therefrom. To the supporting end portions of support members 94e, elongated front lays 95 each integrally formed with a channel-shaped steel 95a and a plate member 95b are respectively fixed so that they extend vertically in an upward direction. The plane of each of the front lays 95 facing the inside of the frame body 42 projects slightly toward the inside of the plane of the cover 41. Since these front lay 95 are formed integrally with the vertically movable table 49 through both the frames 93 and 94, they moves upwardly and downwardly along with the vertically movable table 49. The positions shown in the figures represent their lower limits. At this lower limit, a portion of the upper end of the front lay 95 is engaged with the groove 16a of the frame 16. A pair of rollers 96 are supported by the frame 16 through brackets 97, supports the plate member 95b of the front lay 95 therebetween, and serves to guide the front lay 95 which upwardly and downwarly moves with the position shown being as the lower limit. In addition, a gap represented by symbol t in FIG. 11 is provided between the lower end of the front lay 95 and the upper surface of the pallet 51, in order to facilitate the entering of the pallet 51 thereinto. Moreover, there is further provided an auxiliary stop 98 which closes the gap t after the pallet 51 has been protruded, the auxiliary stop 98 having a channel-shaped cross section. A vertical air cylinder 100 supported by a bracket 99 is provided at the lower end of each front lay 95. The auxiliary stop 98 is fixed to the lower end of the piston rod 101 with it being fitted into a cut portion of the paper stop 95. By causing the piston rod 101 to advance, the auxiliary stop 98 lowers to get into contact with the upper surface of the pallet 51. It is a matter of course that sheet stop surfaces of the auxiliary stop 98 and the front lay 95 are flush with each other. A motor 102 is fixed at the central portion of the vertical member 94b of the subframe 94. Below its motor shaft 103, a cylindrical nut 104 which is threaded along the inner peripheral surface thereof is rotatably supported axially by the vertical member 94b through a slide bearing 105. A screw shaft 106 is screw-engaged with the threaded portion of the nut 104 and horizontally extends in a diretion of the opening 91. This screw shaft 106 is slidably supported axially by a bearing 107 fixed on the slide table 93. A lateral stop 108 for allowing the end surface of the pallet 51 to be in contact therewith to restrict its movement is fixed to the front end portion of the screw shaft 106. A pair of rollers 109 which turn round on the slide table 93 are supported through a bracket 110. Gears 111 and 112 which mesh with each other are fixed, respectively, to the motor shaft 103 and the nut 104. By causing the motor shaft 103 to rotate, the nut 104 rotates through the gears 111 and 112. Thus, the screw shaft 106 which is screw-engaged with its screwed portion advances or withdraws to adjust the protruding stop position of the pallet 51. A limit switch 113 is fixed to the lateral stop 108 and produces a signal when the pallet 51 is brought into contact with the lateral stop 108.

Figure 6:
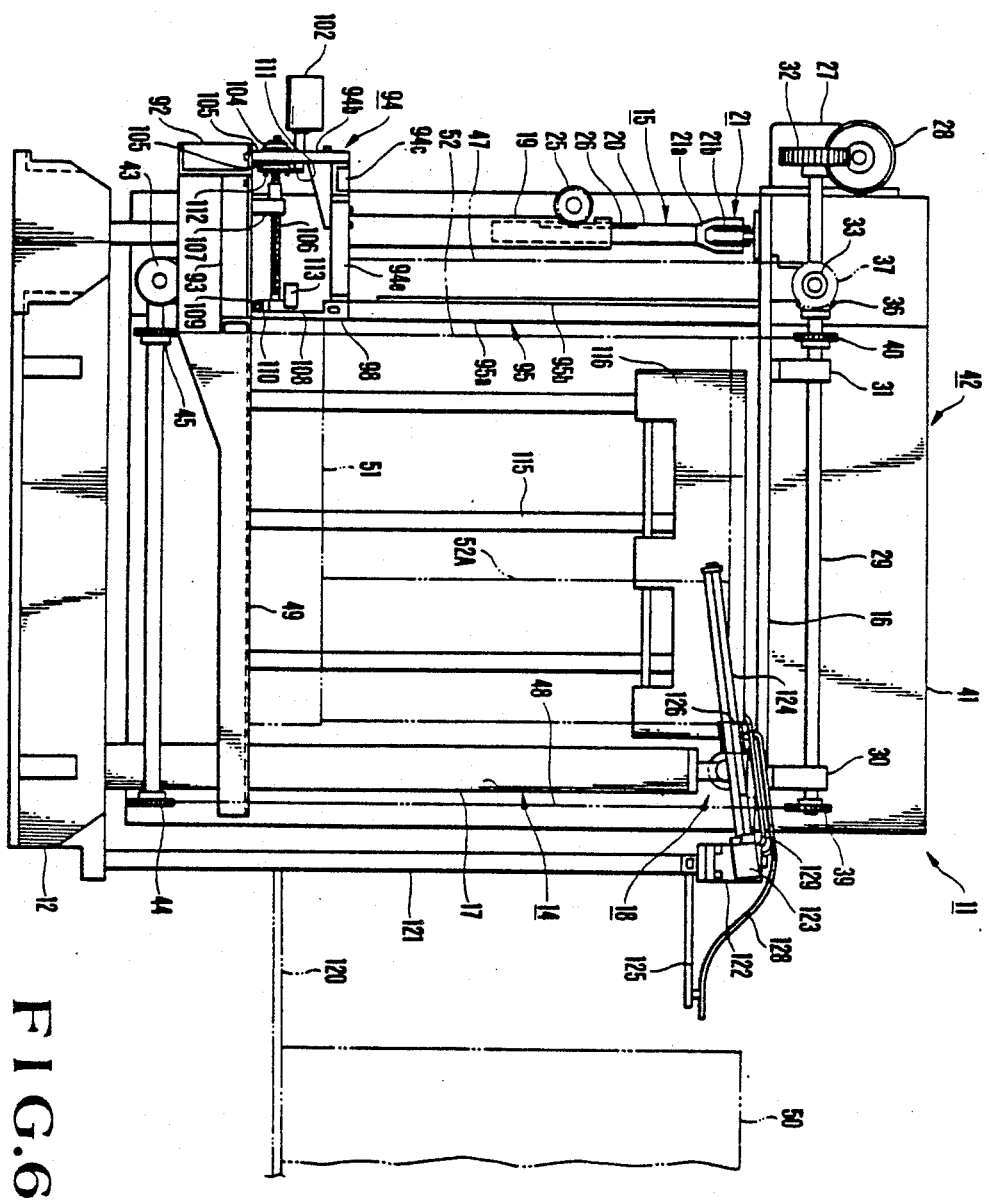
FIG. 6 is a side view when viewed from an arrow D in FIG. 4.

Between the adjacent front lays 95 and outside the front lays 95 of the sheet aligner thus configured, a plurality of vibration plates 114 (four, in this embodiment) are pivotally supported at their lower ends by the cover 41 side so that they can fluctuate. When these vibration plates 114 are driven by a drive unit (not shown), whereby their upper end portions advance or withdraw with respect to the sheet edges at an infinitesimal stroke, a vibration is given to the sheets 52 to align the sheet edges. Moreover, as shown in FIGS. 4 and 6, a plurality of fixed type front lay 115 are provided on the cover 41 side in parallel to each other, and vibration plates 116 which are driven with their lower ends being pivotally supported so that they can fluctuate, are provided above the front lay 115.

Then, a guide device for sheets 52 conveyed from the lift table 50 onto the pallet 51 with they being gripped by the disks 87 of the sheet conveying device 60, and a sheet trailing edge pressing device which presses down the trailing edge of the sheet from the above or pushes it from the back and side directions during sheet alignment by the vibration plates 114 and 116 will be described. Around the lift table 50, a deck 120 on which an operator stands is constructed at substantially the same position as the lower limit position of the vertical movable table 49. At an entrance of the paper aligner 11, a gate shaped support table 121 is projectedly provided with both leg portions thereof being fixed to the deck 120 and the base 12. A holder 123 is supported between a pair of brackets 122 fixed to one end portion of the deck 120. From the holder 123, a pair of stays 124 are protruded toward the forward direction with they being slightly inclined. From the upper end portion of the support table 121, a horizontal guide holder 125 is projectedly provided toward the lift table 50. To the guide holder 125 and a pair of middle and high support shafts 127 extending toward the support 14 from a metal fitting 126 adjustable in movement which is fitted over the stay 124, a fixed side guide 128 circular when viewed from the side which supports the paper bottoms of the sheets 52 conveyed to allow their bottoms to be in contact therewith and a plurality of movable side sheet guides 129 which are formed as long strips are fixed in a manner that they overlap with each other at upper and lower portions, respectively. Moreover, the central portion of the fixed side sheet guide 128 is supported on the support table 121 side. In addition, the movable side sheet guides 129 are moved to the position at which its front end is close to the rear side of the papers 52 on the pallet 51.

On the support shaft 127, plural sets of sheet trailing edge presser 130 are fitted. Each sheet trailing edge presser 130 is provided with a sheet alignment plate 131 which is in contact collectively with the vertical end surface of the sheets 52 delivered onto the pallet 51, and a spring member which biases the paper alignment plate 131 to the trailing edge of the sheets 52 to press it thereonto. Such an arrangement serves to absorb vibration of the sheets 52 by the vibration plates 114, thus to allow the sheet alignment to be more preferable. The sheet trailing edge presser 130 advances and withdraws together with the support shaft 127 in conformity with the sheet size. Further, a side front sheet aligning unit 132 and a side rear aligning unit 133 are disposed at the front and rear position of a side edge of the sheets 52, respectively. More particularly, side front sheet aligning unit 132 is provided with a bracket 134 fixed to the frame 16 of the frame body 42, a handle 135 slidably supported by the edge boss portion thereof, a sheet alignment plate 136 fixed to the top of the handle 135 and in contact collectively with the side end surface of the sheets 52, and a spring member for pressing the sheet alignment plate 136 onto the sheets 52. This arrangement serves to absorb vibration of the sheets 52 to make alignment more preferable. On the other hand, the side rear sheet aligning unit 133 is formed with a holder 138 fixed to a joint plate 137 at the front end of the stay 124, a slide plate 139 slidably fitted into the holder 138 to telescopically moves in two steps, a sheet alignment plate 140 supported by the slide plate 139 by means of bolts and in contact collectively with the vertical end surface of the sheets 52, a spring member for pressing the sheet alignment plate 140 onto the end surface of the sheets 52, and a handle 141 for fixing the slide plate 139. This arrangement also functions to absorb vibration of the sheets 52 by the vibration plate 116 to make sheet alignment more preferable.

The operation of the sheet aligner 11 thus configured will be described. The frame body 42 of the sheet aligner 11 is caused to stand upright in a manner that the vertically movable table 49 is positioned in horizontal condition. The pallet 51 is delivered from the lift table 50 onto the vertically movable table 49 which is in its lower limit position. At this time, the pallet 51 is protruded in advance from the opening 91 toward the outside of the frame body 42 in conformity with the sheet size. Namely, when the motor 102 is caused to revolve to rotate the nut 104 by the mesh-engagement between gears 111 and 112, the screw shaft 106 rotates on the basis of the screw effect. Thus, while turing round the roller 109 on the slide table 93, the lateral stop 108 is withdrawn from the frame body 42 to a predetermined position corresponding to the sheet size and is stopped thereat. Accordingly, when the pallet 51 is delivered, it is protruded until it is brought into contact with the lateral stop 108 and is stopped thereat. Since the limit switch 113 is closed at the same time when the pallet 51 is brought into contact with the lateral stop 108, the air cylinder 100 is operated, whereby the auxiliary stop 98 lowers, so that its lower end is in contact with the upper surface of the pallet 51 and is stopped thereat. As a result, the gap t provided for facilitating entering of the pallet 51 is closed by the auxiliary stop 98. Accordingly, even when the sheets 52 are subsequently loaded onto the pallet 51, there is no possibility that they are protruded from the gap t due to vibration etc. Thus, when the vertically movable table 49 is moved upwardly, the front lays 95 integrally formed with the vertically movable table 49 through the subframe 94 etc. also rise while turning roung the rollers 96. The vertically movable table 49 etc. is stopped by the actuation of the limit switch provided at the upper limit. Then, when the motor 24 is started, the square pillar 20 lowers by the mesh-engagement between the pinion 25 and the rack 26, so that the frame body 42 is inclined. In this instance, the frame body 42 is inclined in a manner that only the support 15 lowers with the sides of the fixed supports 13 and 14 being substantially in a stationary condition.

Onto the lift table 50 which has delivered the pallet 51, the sheet 52 which are conveyed from the warehouse etc. by means of a conveyer etc. are stacked. Thus, an operator stands so as to face the lift table 50 at a portion close to the sheet aligner 11 and arranges a bundle of sheets 52 to be seized by the upper and lower disks 87 of the sheet conveying device 60. At this time, the disks 87 are located at a position indicated by dotted lines in FIG. 8 and the rollers 84 for the cams 79 and 83 are located at a start end portion of the cams 79 and 83, the arm bearing 73 is lowering on the guide shaft 72 and the cam 83 is considerably lower than the groove cam 79 at the start end portion. As a result, the roller arm 75 rotates in a direction in which the cam 83 becomes lower than the cam 79 and is inclined so that the abovementioned inclination of the frame 16 and the inclination in the opposite direction of the roller arm 75 are cancelled with each other. Thus, the roller arm 75 and hence the arm 76 provided coaxially therewith take the horizontal attitude, with the result that the both disks 87 are flush with the sheets 52. After the disks 87 which has undergone the height alignment are caused to grip the sheets 52, when the motor 62 is rotated, the chain 67 begins running. Thus, the running table 69 runs along the rail 68, whereby the arm 76 runs while engaging the rollers 84 with the cams 79 and 83 to convey the sheets 52. The conveying locus of the gripped end of the sheets 52 varies in accordance with the side form of the groove cam 79 shown in FIG. 7 and the height difference between the left and right cams 79 and 83, in a manner stated below. Before the gripped end of the sheets 52 reaches to the vertically movable table 49, the horizontal attitude thereof shifts to the inclined attitude. After the gripped end reaches to the vertically movable table 49, it runs toward the terminating end through a descending gradient path which is in parallel to and slightly higher than the upper surface of the table 49. The sheets 52 thus conveyed are conveyed with portions except for the gripped end sliding on the upper surface of the sheet guides 128 and 129 in the process of the conveying operation. When the running table 69 reaches the advance limit, the disks 87 release the sheets 52. As a result, the sheets 52 sit on the pallet 51, and at the same time the link pin 71 connecting the eccentric plate 70 to the chain 67 turns round the sprocket 63 on the side of the terminating end whereby the running direction of the chain 67 is changed from the forward direction to the backward direction. The sheets 52 which have been released from the gripped condition sit on while sliding their front end edges and one side end edges on the sheet stops 95 and 115, respectively. On the other hand, the rear end edges and the other side edges of the sheets 52 enter from the upper end folded portions of the sheet alignment plates 131, 136 and 140 to sit on while sliding them on the upper end folded portions. When the running table 69 is moved backward, the vibration plates 114 and 116 begins fluctuation. As a result, the sheets 52 on the inclined pallet 51 are in contact collectively with each other in a manner they are pressed onto the front lays 95 and 115 by the vibration given by the fluctuation of the vibration plates 114 and 116. Thus, the sheet edges are alligned. In this instance, since the sheet alignment plates 131, 136 and 140 biased by compression coil springs are pressed onto the rear end surface and the side end surface on the side opposite to the front lays 95 and 115 of the sheets 52, the vibration of the sheets 52 by the vibration plates 114 and 116 is absorbed, resulting in good alignment of th sheets 52. At this time, the sheets 52 are vibrated by the fluctuation of the vibration plates 114 and 116, so that the ones positioned at the lower layer attempt to be protruded from the gap t between the pallet 51 and the front lays 95. However, since the gap t is closed by the auxiliary stop 98, no prontruding action occurs.

When the vibration plates 114 and 116 are stopped after the running table 69 has been withdrawn, the vertically movable table 49 lowers by a predetermined height. At this time, the front lays 95 integrally formed the vertically movable table 49 through the subframe 94 etc. also lower following the vertically movable table 49. Accordingly, even when the pallet 51 is protruded from the frame body 42 toward the outside thereof, there is no possibility that the downward movement of the vertically movable table 49 is prevented. When the alignment and loading of the sheets 52 are thus completed, the frame body 42 is caused to stand upright to place the vertically movable table 49 in horizontal condition to convey the pallet 51 on which the sheets 52 are loaded to the lift table 50 by means of a conveyer etc. As stated above, since there is employed an arrangement such that the pallet 51 is permitted to be protruded from the frame body 42 by a predetermined amount, the sheets 52 which are to be loaded can be loaded on the central portion in the width direction of the pallet 51 irrespective of the sheet size. Accordingly, even when a single pallet 51 is used commonly to various sheet sizes, no inconvenience occurs at the time of sheet feed to the printing press.

As seen from the foregoing description, the present invention provides the paper aligner for use in the printing press having the frame body within which the vertically movable table for stacking the sheets moves upwardly and downwardly. A vertical surface of the frame body which is positioned in a direction perpendicular to a sheet feed direction is provided with an opening for permitting the pallet vertically movable to be protruded from the frame body toward the outside thereof. Support members are provided within the opening such that they moves upwardly and downwardly with the vertically movable table while supporting the front lays and the supporting ends thereof are faced the upper surface of the pallet. Since the front lays move upwardly and downwardly following the upward and downward movement of the pallet even if the pallet is protruded from the frame body, the function of the front lay can be ensured. Moreover, by adjusting the amount protruded from the pallet depending upon the sheet size, it is possible to stack the sheets having various sizes on the central portion using a single pallet which is in conformity with the maximum size sheet so that no inconvenience occurs when sheets having various sizes are fed to the printing press. Accordingly, every time the sheet size is changed, it is unnecessary to exchange the pallet, with the result that work efficiency is improved and the stock of the pallet is reduced, allowing the cost to be reduced. Since the standard of the pallet is unified, various automations at printing factories are facilitated, thus making it possible to promote the automation. In addition, since the auxiliary stop movable upwardly and downwardly which closes the gap between the lower end of each front lay and the upper surface of the pallet is provided at the lower end portion of each front lay, the gap can be substantially removed after the pallet has entered through the opening. Thus, this eliminates the possibility that the sheets are protruded from the frame body toward the outside thereof even when sheets at the lower layer are caused to vibrate for the sheet alignment, resulting in improved sheet alignment function.

What is claimed is:

1. A sheets aligner for use in a printing press comprising:
   a frame body which has vertical surfaces perpendicular to each other and is capable of selectively taking either an upright posture or an inclined posture, one of said vertical surfaces of the frame body which is positioned in a direction perpendicular to a feed direction of sheets to the printing press is provided with an opening;
   a vertically movable table supported for moving upwardly and downwardly within said frame body;
   a pallet which is mounted on said vertically movable table and loaded with the sheets, an end portion of said pallet is permitted to protrude through said opening of said vertical surface of said frame body from the inside to the outside of said frame body;
   a plurality of front lays which extend vertically along said respective vertical surfaces to allow edges of said sheets to be in contact collectively therewith, said front lays being moved upwardly and downwardly with said vertically movable table;

a pallet stopping means disposed at the outside of said opening of said frame body for stopping said pallet which is extruding from inside to outside of said frame body at a predetermined position according to a size of the sheet; and a gap closing means for closing a gap between each of lower ends of said front lays and an upper surface of said pallet in accordance with a detection of the end of said pallet.

2. A sheets aligner as set forth in claim 1, which further comprises a base frame fixed to the side surface of said vertically movable table so that it is protruded from said opening toward the outside thereof, a horizontal slide table connecting between the upper end portions of the protruded end portion of said base frame and said vertically movable table, and a subframe vertically provided so that its bottom portion is fixed on said protruded end portion of said base frame, said pallet stopping means and said gap closing means are disposed on said subframe.

3. A sheets aligner as set forth in claim 1, wherein said pallet stopping means comprises a drive motor, a screw shaft driven by said drive motor to advance or withdraw, a lateral stop fixed to the front end of said screw shaft, said pallet being adapted to be in contact with said lateral stop.

4. A sheets aligner as set forth in claim 3, wherein said gap closing means comprises a limit switch producing a signal when said pallet is in contact with said lateral stop, and means responsive to said signal from said limit switch to operate so as to close said gap.

* * * * *

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 1, line 31, delete "is" and insert ---- are ----.

Column 1, line 32, delete "and", same line delete "is".

Column 1, line 33, after "unpacked" insert a comma ---- , ----, same line delete "is" and insert ---- then ----.

Column 1, line 60, delete "rises" and insert ---- rise ----.

Column 1, line 63, after "lays" insert ---- 4 ----.

Column 2, line 6, delete "every" and insert ---- in a ----.

Column 2, line 8, after "The" delete the comma ",".

Column 2, line 9, delete "these".

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 2, line 39, after "in" insert ---- the ----.

Column 2, line 47, delete "can not" and insert ---- cannot ----.

Column 2, line 59, delete "protruded" and insert ---- protruding ----.

Column 2, line 64, delete "with" and insert ---- when ----, same line delete "being" and insert ---- are ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 3, line 8, after "unless" insert ---- the ----, same line after "of" delete "the".

Column 3, line 24, after "aligner" and insert ---- is ----.

Column 3, line 27, after "posture" delete the comma "," and insert a period ---- . ----, same line delete "one" and insert ---- One ----.

Column 3, line 28, delete "which".

Column 3, line 29, after "press" insert ---- and ----.

Column 3, line 30, delete the semi-colon ";" and insert a period ---- . ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 3, line 31, delete "a" and insert ---- A ----, same line, after "table" insert ---- is ----.

Column 3, line 32, delete "said" and insert ---- the ----, same line, delete the semi-colon ";" and insert ---- and includes ----.

Column 3, line 33, delete the paragraph indention, same line, delete "which is", same line, delete "on the", same line, delete "movable" and insert ---- thereon ----.

Column 3, line 34, delete "table and" and insert ---- which is ----, same line after "sheets" delete the comma "," and insert a

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

period ---- . ----, same line, delete "an" and insert ---- An ----.

Column 3, line 35, delete "said" and insert ---- the ----.

Column 3, line 36, delete "said" and insert ---- the ----.

Column 3, line 37, delete the semi-colon ";" and insert a period ---- . ----.

Column 3, line 38, delete "a" and insert ---- A ----, same line delete "which".

Column 3, line 41, delete "said" and insert ---- the ----.

Column 3, line 42, delete the semi-colon ";" and insert a period ---- . ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 3, line 43, delete "a" and insert ---- A ----, same line, after "means" insert ---- is ----.

Column 3, line 44, delete "said" and insert ---- the ----.

Column 3, line 46, delete "a" and insert ---- the ----.

Column 3, line 47, delete the semi-colon ";", same line, delete "and" and insert a period ---- . ----.

Column 3, line 48, delete "a" and insert ---- A ----.

Column 3, after "means" insert ---- is provided ----.

Column 3, after present line 51, insert the following paragraph ---- The objects of the present invention will become more

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

apparent to those skilled in the art upon a reading of the following detailed description taken in conjunction with the drawings. ----.

Column 3, line 55, delete "is a" and insert ---- are ----, same line, delete "view" and insert ---- views ----.

Column 4, line 17, after "to" insert ---- the ----.

Column 4, line 19, delete "comprising" and insert ---- including ----.

Column 4, line 28, delete "comprises" and insert ---- has ----.

Column 4, line 37, delete "the".

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 4, line 63, after "in" insert ---- a ----.

Column 4, line 65, after "in" insert ---- an ----.

Column 4, line 67, delete "threrof" and insert ---- thereof ----.

Column 5, line 6, delete "upwardly and downwardly".

Column 5, line 7, after "table" insert ---- upwardly and downwardly ----.

Column 5, line 8, after "supported" delete the period "." and insert a comma ---- , ----, same line delete "Namely," and insert ---- namely, ----.

Column 5, line 9, after "16" insert ---- and ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 5, line 21, delete "a" and insert ---- an ----.

Column 5, line 55, delete "downwarly" and insert ---- downwardly ----.

Column 5, line 57, delete "perpendiculaly" and insert ---- perpendicularly ----.

Column 5, line 62, delete "coveying" and insert ---- conveying ----.

Column 6, line 14, delete "27" and insert ---- 22 ----.

Column 6, line 19, delete "the".

Column 6, line 34, delete "link pin" and insert ---- chain ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 6, line 40, after "thus" insert a comma ---- , ----, same line delete "to effect" and insert ---- effecting ----.

Column 6, line 42, delete "shaft" and insert ---- shafts ----.

Column 6, line 47, delete "therreof" and insert ---- thereof ----.

Column 6, line 48, after "parallel" insert ---- relation ----.

Column 6, line 54, delete "the" (first occurrence).

Column 6, line 55, delete "these both" and insert ---- the ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 6, line 68, delete "etc."

Column 7, line 8, delete "both".

Column 7, line 15, after "adjustable" insert ---- by using two thumb nuts 88, ----.

Column 7, line 29, delete "feed".

Column 7, line 34, delete "be now" and insert ---- now be ----.

Column 7, line 36, delete "rectangular" and insert ---- rectangularly ----.

Column 7, line 58, delete "is reached" and insert ---- extends ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 8, line 1, delete "these" and insert ---- the ----, same line, delete "lay" and insert ---- lays ----.

Column 8, line 3, delete "moves" and insert ---- move ----.

Column 8, line 7, delete "the" (second occurrence) and insert ---- a ----.

Column 8, line 10, delete "supports" and insert ---- supporting ----.

Column 8, line 11, delete "serves" and insert ---- serve ----.

Column 8, line 12, delete "downwarly" and insert ---- downwardly ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 8, line 20, delete "cyliner" and insert ---- cylinder ----.

Column 8, line 22, delete "the" (second occurrence) and insert ---- a ----.

Column 8, line 24, delete "paper stop" and insert ---- front lay ----.

Column 8, line 36, delete "diretion" and insert ---- direction ----.

Column 8, line 63, delete "FIGS. 4 and" and insert ---- FIG. ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 8, line 64, delete "lay" and insert ---- lays ----.

Column 8, line 65, after "parallel" insert ---- relation ----.

Column 9, line 2, delete "with" and insert ---- while ----, same line, delete "being" and insert ---- are ----.

Column 9, line 5, delete "the" (second occurrence).

Column 9, line 10, delete "vertical" and insert ---- vertically ----.

Column 9, line 11, delete "paper" and insert ---- sheets ----.

UNITED STATES PATENT AND TRADEMARK OFFICE
CERTIFICATE OF CORRECTION

PATENT NO.  : 4,717,142

DATED       : January 5, 1988

INVENTOR(S) : Saito et al

It is certified that error appears in the above-identified patent and that said Letters Patent is hereby corrected as shown below:

Column 9, line 17, delete "with they".

Column 9, line 18, delete "being" and insert ---- and are ----.

Column 9, line 20, delete "To the".

Column 9, line 21, delete in its entirety.

Column 9, line 22, delete in its entirety.

Column 9, line 23, delete in its entirety.

Column 9, line 24, delete "the stay 124, a" and insert ---- A ----, same line, after "side" insert ---- sheet ----, same line, after "128" insert a comma ---- , which is ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 9, line 25, after "side" insert a comma ---- , ----.

Column 9, line 27, delete "and a" and insert ---- is fixed to the guideholder 125. A ----.

Column 9, line 29, delete "in a manner that they" and insert ---- to a pair of middle and high support shafts 127 extending toward the support 14 from a metal fitting 126 adjustable in movement which is fitted over the stay 124. The fixed side guide 128 and the plurality of movable side sheet guides. ----.

Column 9, line 33, delete "the" and insert ---- a ----.

Column 9, line 34, delete "its" and insert "their", same

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

line, delete "end is" and insert ---- ends are ----.

Column 9, line 37, delete "presser" and insert ---- pressers ----.

Column 9, line 41, delete "paper" and insert ---- sheet ----.

Column 9, line 51, after "particularly," insert ---- the ----.

Column 9, line 64, delete "moves" and insert ---- move ----.

Column 10, line 4, delete "preferable" and insert ---- accurate ----.

Column 10, line 17, delete "turing" and insert ---- turning ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 10, line 36, delete "etc.".

Column 10, line 37, delete "roung" and insert ---- round ----.

Column 10, line 38, delete "etc."

Column 10, line 47, delete "sheet" and insert ----sheets ----.

Column 10, line 48, delete "etc." (both occurrences), same line, delete "conveyer" and insert ---- conveyor ----.

Column 10, line 65, delete "the". (2nd occurrence)

Column 10, line 66, delete "has" and insert ---- have ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 11, line 9, delete "to".

Column 11, line 11, delete "to".

Column 11, line 34, delete "begins" and insert ---- begin to ----.

Column 11, line 35, delete "tion" and insert ---- te ----.

Column 11, line 36, after "manner" insert ---- such that ----.

Column 11, line 39, delete "alligned" and insert ---- aligned ----.

Column 11, line 45, delete "th" and insert ---- the ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

Column 11, line 51, delete "prontruding" and insert ---- protruding ----.

Column 11, line 55, after "formed" insert ---- with ----.

Column 11, line 57, delete "etc."

Column 11, line 66, delete "conveyer etc." and insert ---- conveyor ----.

Column 12, line 18, delete "moves" and insert ---- move ----.

Column 12, line 21, delete "faced" and insert ---- facing ----.

Column 12, line 62, after "sheets," insert ---- said pallet

UNITED STATES PATENT AND TRADEMARK OFFICE
CERTIFICATE OF CORRECTION

PATENT NO. : 4,717,142
DATED : January 5, 1988
INVENTOR(S) : Saito et al

It is certified that error appears in the above-identified patent and that said Letters Patent is hereby corrected as shown below:

having ----, same line, delete "of".

Column 12, line 63, delete "said pallet is permitted" and insert ---- adapted ----.

Column 12, line 66, delete "which extend" and insert ----, said plurality of front lays extending ----.

Column 13, line 3, delete "a".

Column 13, line 8, delete "a", same line, after "of" insert ---- the ----.

Column 14, line 4, delete "are" and insert ---- being ----.

Column 14, line 9, after "draw" delete the comma "," and insert ---- and ----.

UNITED STATES PATENT AND TRADEMARK OFFICE
CERTIFICATE OF CORRECTION

PATENT NO. : 4,717,142

DATED : January 5, 1988

INVENTOR(S) : Saito et al

It is certified that error appears in the above-identified patent and that said Letters Patent is hereby corrected as shown below:

In the Abstract

Line 4, delete "thereby to" and insert ---- to thereby ----.

Line 12, after "a" insert ---- device ----.

Line 13, delete "stop".

Line 19, delete "condition" and insert ---- conditions when ----.

Signed and Sealed this

Fourth Day of October, 1988

Attest:

DONALD J. QUIGG

*Attesting Officer*    *Commissioner of Patents and Trademarks*